US005594715A

United States Patent [19]
Ogasawara

[11] Patent Number: 5,594,715
[45] Date of Patent: Jan. 14, 1997

[54] EXPOSURE CONTROL DEVICE OF A CAMERA AND METHOD

[75] Inventor: Akira Ogasawara, Kanagawa-ken, Japan

[73] Assignee: Nikon Corporation, Tokyo, Japan

[21] Appl. No.: 571,637

[22] Filed: Dec. 13, 1995

[30] Foreign Application Priority Data

Dec. 21, 1994 [JP] Japan .................................. 6-318161

[51] Int. Cl.$^6$ ............................................. G03B 7/26
[52] U.S. Cl. .............................................. 369/212; 369/246
[58] Field of Search ...................... 354/484, 456, 354/267.1

[56] References Cited

U.S. PATENT DOCUMENTS

| | | | |
|---|---|---|---|
| 3,623,409 | 11/1971 | Uno et al. | 354/456 |
| 4,428,655 | 1/1984 | Suzuki et al. | 354/456 |
| 4,831,406 | 5/1989 | Seki et al. | 354/484 |
| 4,914,469 | 4/1990 | Ishimura et al. | 354/484 |
| 5,389,998 | 2/1995 | Dunsmore et al. | 354/484 |

*Primary Examiner*—W. B. Perkey
*Attorney, Agent, or Firm*—Oliff & Berridge

[57] ABSTRACT

A camera exposure control device reduces battery power consumption during film exposure at the picture shooting time for long exposure times greater than several seconds such as bulb shooting and time shooting. The camera exposure control device includes a power source line from a battery power source to a control device and the like. A DC/DC converter is also on the power line. The control device stops operation of the DC/DC converter during the long exposure time where the shutter time is longer than a predetermined time. In other words, the control device controls the operation of the DC/DC converter during film exposure at shooting times where the film exposure time is longer than several seconds. The control device interrupts the DC/DC converter during these long exposure times. Further, other electric parts such as IC's and devices that do not require electricity supplied during the long exposure times can be turned off by the control device.

19 Claims, 5 Drawing Sheets

EXPOSURE CONTROL DEVICE OF A CAMERA AND METHOD

BACKGROUND OF THE INVENTION

1. Field of the Invention

The present invention is an exposure control device of a camera that performs photography sequence control during film exposure when the shooting mode of a single lens reflex camera is set to be bulb shooting with a long exposure time, time shooting with a long exposure time or when shooting is done with a relatively longer shutter time.

2. Background of Related Art

FIG. 3 shows a schematic structure on the power source line from the battery power source that is used in conventional single lens reflex cameras.

A CPU 1 includes a microcomputer used as a control device to control the shooting sequence of a camera and to detect the mode selected with a photographer input device (not shown) among the various shooting modes of the camera. Based on the selected mode, the CPU 1 also performs the exposure algorithm and exposure operation.

An interface 2 is made of an IC or the like. The CPU 1 uses commands to the interface 2 to send signals to other control system structure members and to communicate input returning from other control system structure members to the CPU 1. A sensor 3 including an IC can be a photometry sensor, a dimmer sensor for flash light detection, an AF (auto focus) sensor or the like.

In FIG. 3, the sensor 3 can connect to the CPU 1 if the CPU 1 has an AD converter to AD-convert the analog output from the sensor 3. However, the interface 2 can be inserted between the sensor 3 and the CPU 1 if the CPU 1 does not have an AD converter or if the sensor 3 output needs to be amplified.

A first display device 4 and a second display device 5 are used as the-display. Such display devices are usually made of liquid crystal display devices or LEDs (light emitting diodes). A camera external display unit mounted on the top edge or the like of the camera body (not shown) can be used as the first display device 4. An internal finder display unit embedded in the finder field frame can be used as the second display device 5.

A battery power source 6 is connected by a power source line 7 to control system structure members such as the CPU 1, the interface 2, the sensor 3, the first display device 4 and the second display device 5. A DC/DC converter 8 is connected in the power source line 7 to convert the electric current voltage to a predetermined voltage and to ensure a stable supply of electric current voltage to the control system structure members.

The DC/DC converter 8 is controlled with the CPU 1. The electric current from the battery 6 to the control system structure members is controlled by the DC/DC converter 8 to enable each of the control system structure members to operate under the required conditions.

A trend in more recent cameras is for the CPU 1 to control and perform more of the shooting operations. For example, the CPU 1 can perform diaphragm control, as shown in FIG. 4. Further, the CPU 1.can output signals to control the shutter or to wind film, as shown in FIG. 5. The controlling signals to perform these operations can be sent directly from the CPU 1 to the respective control system structure members or through the interface 2.

FIG. 4 shows an example of a diaphragm mechanism and a diaphragm control mechanism of a single lens reflex camera. A lens barrel is used as an interchangeable lens 11 having a shooting optical system (lens) 12 and includes a diaphragm preset ring 13, a diaphragm mechanism 14, and a mounting bayonet 15 to mount on a camera body (not shown).

As shown, a diaphragm interlocking member 14a operates the diaphragm mechanism 14 so that the diaphragm mechanism 14 is stopped down when the diaphragm interlocking member 14a moves upward because of the energizing spring 16 force. The rotational position of the diaphragm preset ring 13 determines a stopper 13a position. The diaphragm is able to stop-down until the interlocking member 14a contacts the stopper 13a.

In a diaphragm control mechanism as shown in FIG. 4 for example, a selection device (not shown) selects a camera shooting mode. The CPU 1 performs diaphragm mechanism control and shutter control based on the shooting mode entered. The selection device (not shown) can select at least one of a shutter priority mode, a diaphragm priority mode, a program mode, or a manual mode.

In the FIG. 4 example, when the shutter priority mode or the program mode is selected, the diaphragm is electrically stopped (enmeshed) by the CPU 1. In the diaphragm priority mode or the manual mode, the diaphragm position is determined by the preset ring 13. Therefore, only in the shutter priority mode or the program mode does the camera control the diaphragm. The control process in the shutter priority control mode is explained below.

The CPU 1 first stores in memory or the like the relationship between the number of steps of closing-in the interchangeable lens 11 and the displacement of the diaphragm interlocking member 14a.

In other words, a diaphragm operation member 17 in the camera body side (not shown) enmeshes the diaphragm interlocking member 14a in the interchangeable lens 11 side during the mounting of the interchangeable lens 11. The diaphragm operation member 17 opens the diaphragm at a determined position by opposing the energizing spring 16 force in cooperation with the energizing spring 18. As shown in FIG. 4, the energizing spring 18 has a stronger force than the energizing spring 16.

A conventional stop-down driving device (represented by reference numbers 19–22) is well known in the art. The conventional stop-down driving device interlocks with the film winding mechanism, as shown in FIG. 4.

An interlocking member 23 connects the diaphragm member 17 and a first lever 19 using a long hole 23a and a pin 23b. When the diaphragm control mode is selected, the diaphragm preset ring 13 is preferably set to the value corresponding to the smallest diaphragm diameter.

Light rays 24 passing through the open diaphragm are received by the light receiving element 25 in the vicinity of a pentagonal prism (not shown) and corresponding logarithmically compressed values are outputted from the photometry circuit 26. The output values are converted to digital values by an AD converter (A/D) in the CPU 1. The CPU 1 then computes the diaphragm value and the shutter time based on data such as film sensitivity, shooting mode, and open F-value.

In the state shown in FIG. 4, the CPU 1 detects when a release button 27 is pressed and performs control operations based on the diaphragm value and the shutter time computed at that time. In other words, the CPU 1 also functions as an exposure control device to control film exposure based on various conditions.

Control operations will now be explained. Port A is made LOW for a predetermined period of time. A transistor Tr1 magnetizes a release magnet 30 to be used for starting stop-down for the same period of time. A first enmesh lever 21 is released by the attraction force. As shown in FIG. 4, the first lever 19 rotates counterclockwise because of the spring force of an energizing spring 19a drawing the interlocking member 23 toward the right.

Then, the diaphragm operation member 17 rotates clockwise against the spring force of an energizing spring 18. Thus, the diaphragm mechanism 14 is gradually closed, corresponding to the rotation of the operation member 17.

Port B is made LOW concurrently with port A. Port B LOW causes a transistor Tr2 to turn on and supply electric power to a photo interrupter 31 with the start of stop-down. The photo interrupter 31 is an encoder for monitoring stop-down. Thus, the stop-down process is detected by a slit for encoding around the circumference of a disk 32a that rotates by enmeshing with the operation member 17. The encoding slit passes by the photo interrupter 31, which generates a pulse proportional to the amount of rotation of the disk. Hereafter, the proportional pulse is referred to as a stop-down pulse.

The stop-down pulse is received at the interruption input and the counter input (pulse cnt) of the CPU 1. When the CPU 1 detects the number of pulses equivalent to the stop-down amount necessary to adjust to the precalculated stop-down value, port C is made LOW for a predetermined time. Thus, a transistor Tr3 is turned on for the predetermined time, and a diaphragm enmesh magnet 34 is magnetized. The diaphragm enmesh magnet 34 loses attraction force against the diaphragm enmesh stop hook 35. The stop hook 35 is rotated counterclockwise from the spring force of an energizing spring 35a to stop the rotation of the disk 32a by enmeshing a gear 32b in the circumference of the disk 32a. Enmeshing the gear 32b stops the diaphragm.

The supply of electric current must be done early to offset the amount of stop-down during a delay time Td defined as the time from supply of the diaphragm enmesh magnet 34 to the diaphragm stop. Further, the generation cycle of stop-down pulses actually becomes shorter with time. The generation cycle becomes shorter because the rotation member's rotation, such as the diaphragm operation member 17, accelerates during the stop-down process of the diaphragm because of the balancing of the spring forces of the energizing springs 16, 18, and 19a.

Acceleration of the stop-down speed is not desirable. However, if the acceleration is small during the delay time Td from turning on the diaphragm enmesh magnet 34 until the diaphragm stop, significant problems are avoided. The actual delay time Td is preferably about 2 ms.

A conventional camera structure is made so that the stop-down speed is nearly uniform, and the time is detected for each stop-down pulse generated. The difference between the time of the previous stop-down pulse generated and each detected time is the pulse period. From the pulse period, a most immediate stop-down speed Vp, and the delay time Td, the number of pulses generated (hereafter, over-run pulse number, delta n) during the delay time Td is computed. When the total of delta n and an integrated value Cp of the stop-down pulses since the stop-down began equals the number of pulses equivalent to the targeted stop-down amount, current supply begins to the enmesh magnet 34.

FIG. 5 shows the structure of an electronic shutter used as a shutter mechanism.

A shutter bottom board 41 has front blade arms 44 and 45 that support freely rotating front blades 42a–42c including the shutter blades (front curtain).

As shown in FIG. 5, the front blade arm 45 is energized in the direction of the arrow by a spring (not shown). One edge section 45b is stopped by engaging with one edge of the front blade solid lever 48. The front blade solid lever 48 is supported by the shutter bottom board 41 to rotate freely. A protrusion unit 45a is formed in the front blade arm 45 to press and turn on the front blade arm running completion switch immediately before front blade running completion.

The front blade solid lever 48 is stopped by an enmesh member (not shown) and opposes the spring force of a spring 48a energized clockwise as shown in FIG. 5.

Rear blade arms 46 and 47 support freely rotating rear blades 43a–43c that form a second shutter blade (rear curtain). The rear arm 47 is energized in the direction of the arrow by a spring (not shown), but an edge 47a is prevented from rotating by enmeshing with a rear blade solid lever 49. The rear blade solid lever 49, like the front blade solid lever 48, is usually stopped by enmeshing with an enmeshing member (not shown) and opposes the clockwise force of a spring 49a.

An armature 51 is located on one edge of the front blade solid lever 48. An armature 54 is located on one edge of the lever 49. Both armatures 51 and 54 are stopped during the beginning of the shooting sequence from releasing the front curtain and the rear curtains, respectively, by supplying electric current to magnetize a transistor Tr4 and a transistor Tr5, respectively. The lever enmeshing member (not shown) releases after completion of magnetizing by a front blade driving coil MG1 and a rear blade driving coil MG2.

A magnet 53 and a magnet 56 are magnetized during electric current flow of the coils MG1 and MG2, respectively. Magnetic material is labelled 52 and 55, respectively.

When diaphragm control is complete, the CPU 1 turns off the transistor Tr4, as shown in FIG. 4, after withdrawal of a main mirror (not shown) from the light path 24 of the lens 12.

Thus, the armature 51 on the front blade solid lever 48 is released by the magnet 53 and forcibly rotates right by the spring 48a. This causes the arm 45 to begin rotating to the right by a spring (not shown), and the front blades 42a–42c begin movement clockwise, as shown in FIG. 5.

When electric current to the coil MG1 is shut off, the CPU 1 turns off the transistor Tr5 after waiting for the exposure time (shutter time) to elapse.

Then, electric current to the coil MG2 is also shut off, and the magnet 56 is demagnetized. The demagnetization of the magnet 56 causes the armature 54 and the lever 49 to rotate to the right in a similar manner as the arm 45 described above. The arm 47 begins to rotate to the right. This, in turn, causes the rear blades 43a–43c to run, and the shutter aperture 40 is closed. Complete closure of the aperture 40 turns on a switch SW4.

When switch SW4 turns on indicating exposure complete, the film winding begins. Concurrently, the various mechanisms necessary for the next shooting sequence are reset. Specifically included can be placing the shutter mechanism in the closed position, stopping the shutter mechanism by a mechanical enmeshing member, and lowering the main mirror (not shown) to the original position.

In a conventional camera, the following problems arise when using a control system with a simple power source line to conduct the shooting sequence operation, as shown in FIG. 3. The conventional camera control system is configured with the DC/DC converter 8 installed on the power source line from the battery 6. The DC/DC converter 8 continuously stabilizes the power source voltage for the entire system including, for example, during the normal shooting preparation operation time. Thus, even when the shutter time exceeds several dozen seconds, and minimal tasks are required during the film exposure like shutter time completion or detecting the exposure completion signal, the DC/DC converter 8 continuously operates.

Therefore, the conventional camera electric power consumption is very inefficient during time shooting.

Hereafter, time shooting refers to a shooting mode where exposure begins by the manual selection of the release button by the photographer, and exposure ends by a second manual selection of the release button. Alternatively, the exposure can end by photographer operation of other camera dial controls. Hereafter, bulb shooting refers to a shooting mode where exposure continues as long as the photographer engages the release button, and exposure completes when the photographer releases engagement (a finger) from the release button.

When performing time shooting and bulb shooting, a battery has high power consumption during continuous film exposure for several hours. Thus, battery power exhaustion in one night can be a major concern.

In the conventional camera when the battery charge becomes weak, the attraction power of the shutter curtain enmeshing magnet (coils MG1, MG2), for example, becomes weak during film exposure operations and causes film shooting operation problems. For example, running of the shutter rear curtain (rear blades 43a–43c) ends when the battery charge becomes weak. Therefore, a countermeasure is needed to control the camera battery consumption.

SUMMARY OF THE INVENTION

An objective of the present invention is to solve at least the problems described above. The present invention provides a camera exposure control device that reduces power consumption during film exposure by turning off control system structure members on the power source line that do not need electric current supply when the shooting mode of a single reflex camera is bulb shooting, time shooting with long exposure time or even a relatively long shutter time.

The camera exposure control device of the present invention includes a DC/DC converter on the power source line from the battery power source. When the bulb shooting mode or the time shooting mode is selected, the film exposure time will be long. The exposure control device prevents the DC/DC converter operation during film exposure, when detecting a film exposure time longer than a predetermined time.

The camera exposure control device includes a clock oscillation circuit, a sequence control device and a process device. The sequence control device controls the shooting sequence based on the camera control device. The process device processes the operation process of the clock oscillation circuit and the execution process of the sequence control device during the film exposure operation. The process device stops the clock oscillation circuit when the camera control device executes control so that the DC/DC converter does not operate during film exposure. The process device resumes the operation of the clock oscillation circuit through film exposure completion signals. Therefore, the processing of the camera control device resumes following the shooting sequence by the sequence control device.

With the present invention, if the film exposure time is longer than the predetermined time, the DC/DC converter installed on the power source line from the battery power source to perform electric current voltage control is stopped. Thus, long exposure time shooting, such as time shooting, bulb shooting or shooting requiring more than several seconds of film exposure time stops the DC/DC converter. Further, when the DC/DC converter is stopped, electric parts such as ICs and devices that do not require power supply during film exposure time are turned off.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
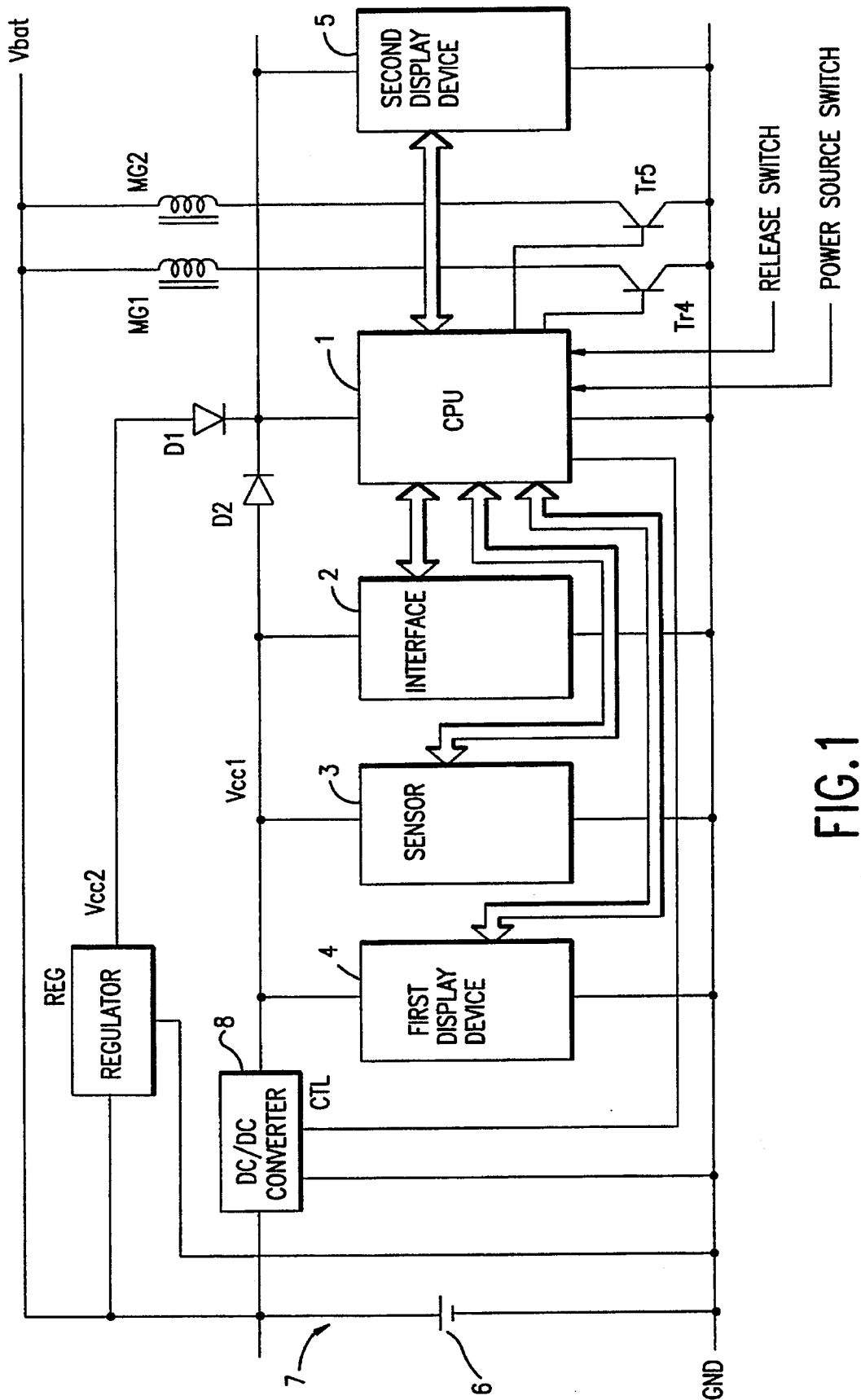
FIG. 1 is a schematic drawing showing the power source line from the battery power source of a single lens reflex camera of an exposure control device of a camera.

Referring to FIG. 1, if the film exposure time is a long exposure time that exceeds a predetermined time, in a first preferred embodiment, a control device in a CPU 1 controls a DC/DC converter 8 to reduce its own power consumption. The DC/DC converter is installed on a power source line 7 from a battery power source 6 and reduces its own power consumption by halting operations. Examples of exposures that take more than several seconds include time shooting or bulb shooting.

The control device in the CPU 1 is structured to reduce the DC/DC converter 8 power consumption on the power line 7 to as little as needed. In addition, electrical parts such as ICs and devices that do not require power supply during the film exposure can also be turned off. Thus, power consumption at the battery power source is reduced to as little as is needed.

The structure of a camera according to the first preferred embodiment is shown in FIG. 1. The control system structure members include ICs and devices that can turn off the DC/DC converter 8 during long time film exposure. Other control system structure members can have the supply of electricity stopped during the film exposure including a first display device 4, a sensor 3, an interface 2, and the like. These ICs are connected electrically to an output line Vcc1 of DC/DC converter 8 on the power source line 7.

In contrast, the CPU 1 operates during the film exposure and continuously requires electricity. The CPU 1 is connected to the output line Vcc1 of the DC/DC converter 8 beyond the point of connection of a diode D1. The CPU 1 is connected on the output line Vcc2 beyond the point of connection of a diode D2 where the power source voltage of a battery power source 6 is also connected through a release regulator REG.

The power source voltage is normally slightly lower than the output Vcc1. Thus, the CPU 1 supplies electricity to the output Vcc1. Schottky diodes are preferably used for the diode D1 and the diode D2. The diode 1 and the diode 2 combine the power sources.

When the shooting sequence begins, first the transistor Tr4 and the transistor Tr5 are turned on to enmesh and stop the shutter front curtain (front blades 42a–42c) and the rear curtain (rear blades 43a–43c), respectively. The operation of the shutter mechanism by the electronic shutter was explained with reference to FIG. 5. To enmesh and stop the rear curtain, at least the transistor Tr5 must be controlled, even if the DC/DC converter 8 is turned off. Thus, the transistor Tr5 connects directly to the CPU 1 port, which executes control and can supply electricity. Alternatively, an interface (not shown) may be provided from the transistor Tr5 directly to the CPU 1 power source.

FIG. 1 shows the transistor Tr4 and the transistor Tr5 both connected to a CPU 1 port. If the number of CPU 1 ports is limited, the transistor Tr4 for enmeshing and stopping the front curtain can also be controlled through an interface 2. The interface 2 has electricity supplied from the output line Vcc1.

Figure 4:
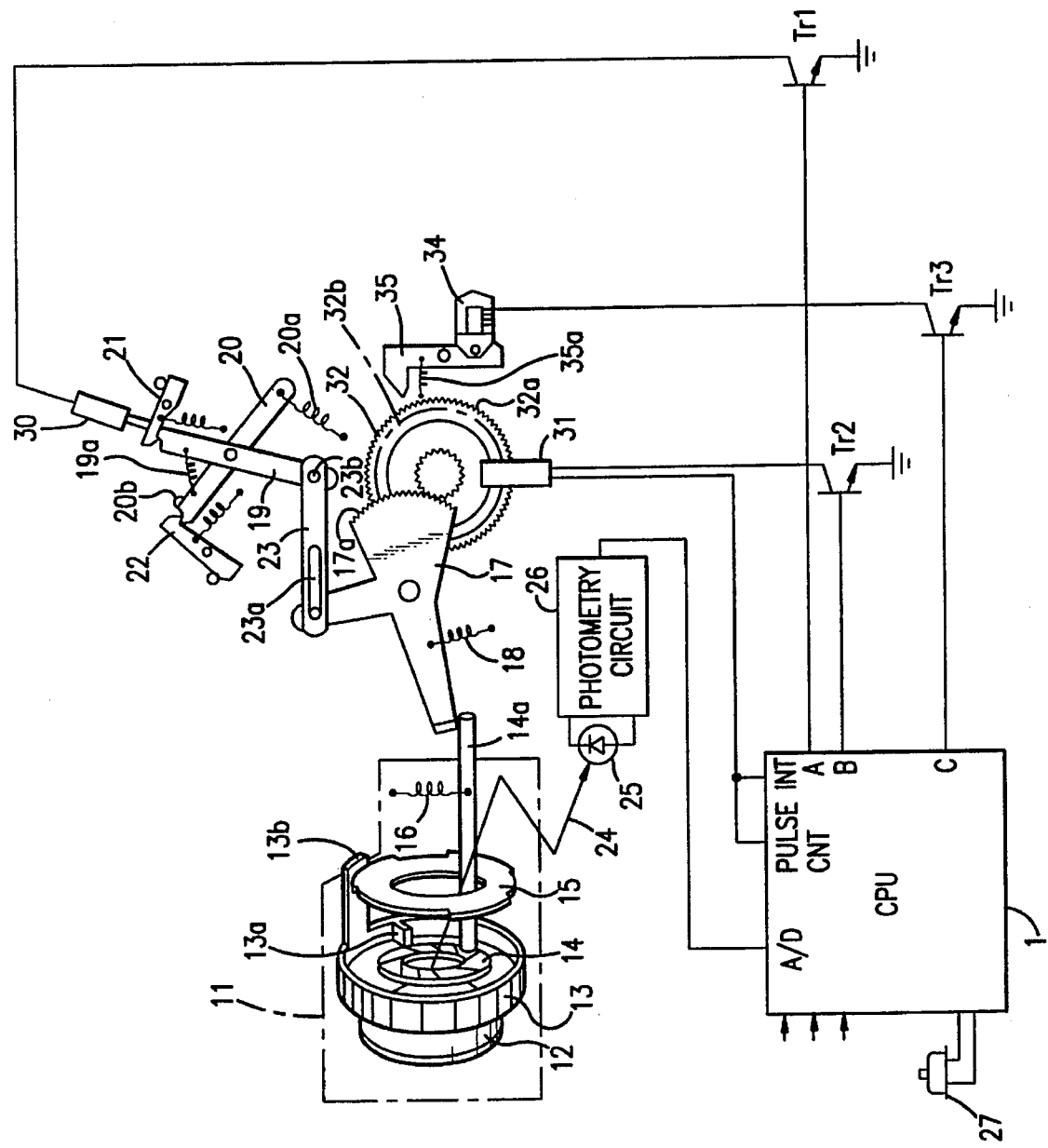
FIG. 4 is a diagram showing a mechanism unit including a part of a camera exposure control device and a schematic diagram including the electrical system of the diaphragm control mechanism of a single lens reflex camera.

After turning on the coils MG1 and MG2, which become the shutter curtain enmesh magnet, diaphragm control as explained with reference to FIG. 4, is executed simultaneously with the main mirror raising motion.

The transistors Tr1, Tr2 and Tr3 required for diaphragm control, as described with reference to FIG. 4, can be connected directly to the CPU 1 (not shown in FIG. 1). Alternatively, the transistors can be controlled through other interfaces (not shown) because the transistors Tr1–Tr3 functions complete during the film exposure starting time. Therefore, the transistors are not required to be turned on until the next exposure sequence.

After starting the front curtain by turning off the transistor Tr4, the CPU 1 stops the DC/DC converter 8 to reduce power consumption if the shutter time is longer than the predetermined time. The predetermined time could be 1 second, for example.

The CPU 1 also can turn off the DC/DC converter 8 for a shooting mode with a normally long exposure time such as bulb shooting and time shooting.

After turning off the DC/DC converter 8, the CPU 1 waits for the predetermined shutter time to elapse or monitors a switch input for the signal indicating exposure completion/interruption. The main power source switch or the release button state detection switch can be used for such a switch input.

If both display patterns of the liquid crystal display on the first display device 4 and the second display device 5 are changing to show the photographer that the camera is operating normally or to indicate the elapsing exposure time, electricity can be supplied to the first display device 4 from the same power source as the CPU 1. That enables display during the stop period (nonoperation period) of the DC/DC converter 8. To change the display to the photographer, the CPU 1 can transmit display data to the display devices at a predetermined cycle interval. In general, 100 mS to several 100 mS are sufficient for such cycles.

If the predetermined shutter time has elapsed, the CPU 1 resumes operation of the DC/DC converter 8 operations. Alternatively, the photographer can input film exposure completion through a switch. The CPU 1 also executes winding of the film using the winding motor or a mechanism (not shown). At the same time, each control system structure member can be charged in preparation for the next shooting.

In the first preferred embodiment, the camera control device is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowchart shown in FIG. 2 can be used as the controller. As shown, a distributed processing architecture is preferred for maximum data/signal processing capability and speed.

Figure 2:
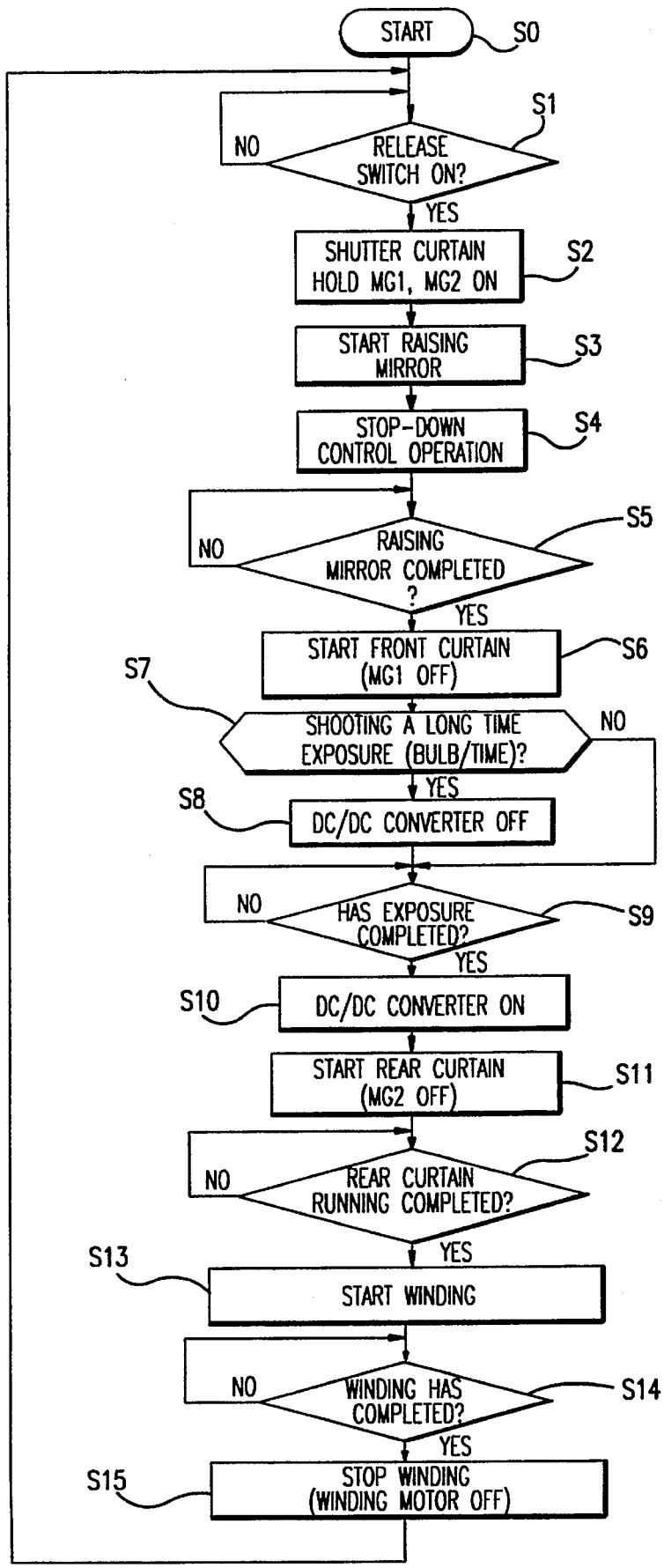
FIG. 2 is a flow chart showing the control operation by the camera exposure control device.
Figure 3:
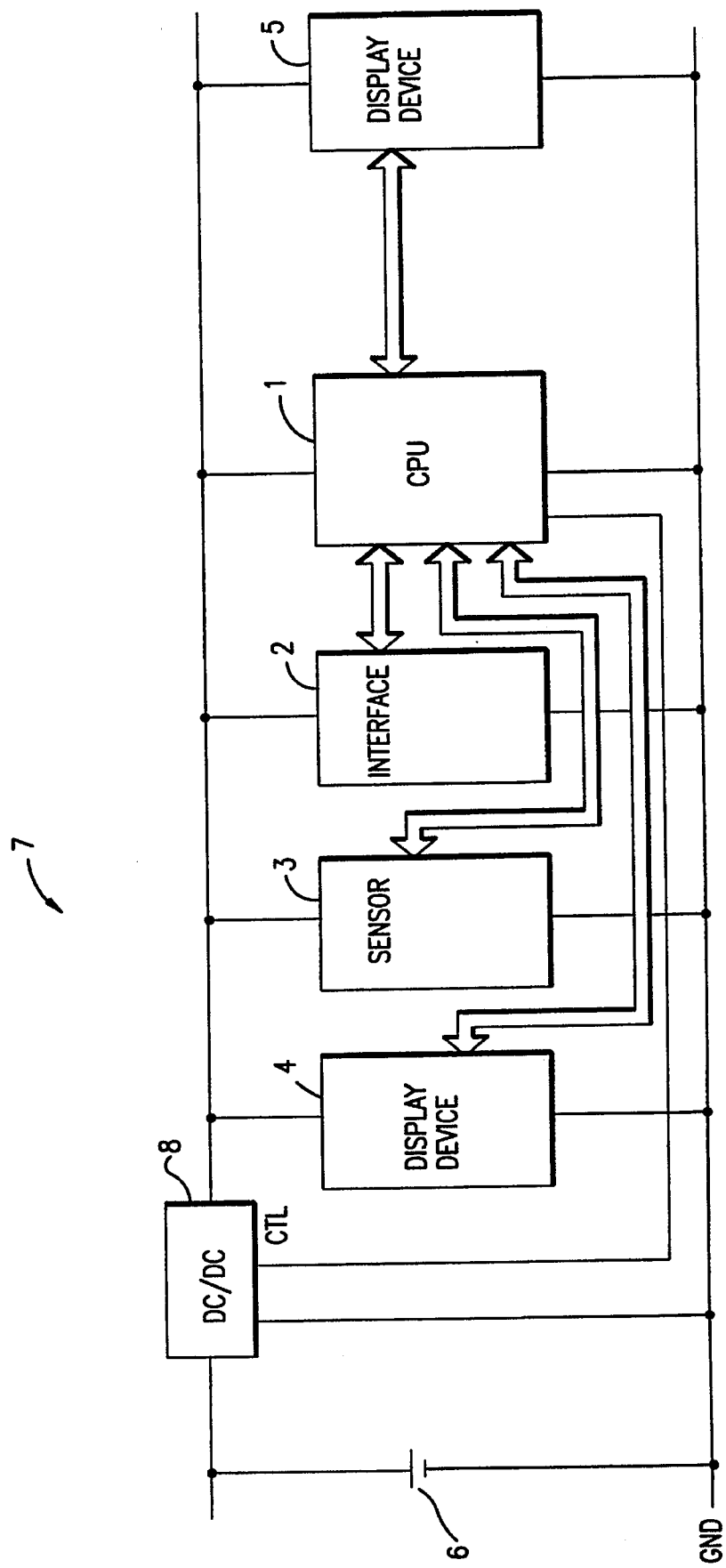
FIG. 3 is a schematic drawing showing the power source line from the battery power source of a conventional camera exposure control device.

FIG. 2 is a flow chart of the exposure control device operations according to the first preferred embodiment where the CPU 1 acts as a control device.

After starting in step S0, in step S1 it is determined whether the release button (release switch) is on. If the release button is on, the shooting sequence is started by the CPU 1, which functions as the control device.

Figure 5:
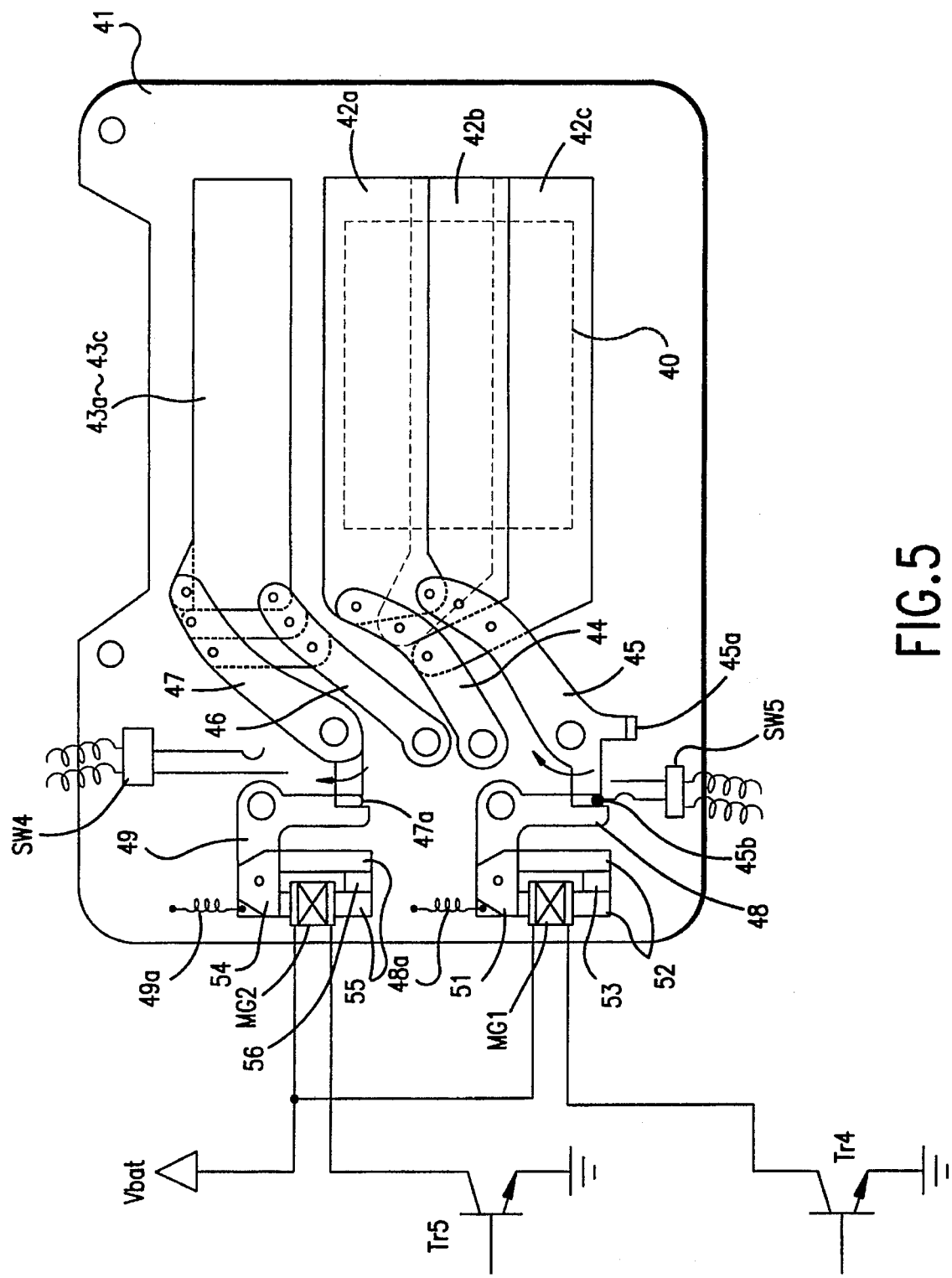
FIG. 5 is a diagram showing a mechanism unit including a part of the camera exposure control device and a drawing showing the schematic diagram of the electronic shutter.

In step S2, the shutter front curtain and the shutter rear curtain are maintained by the shutter curtain enmesh magnets MG1 and MG2, respectively. MG1 and MG2 are enabled by turning on the transistor Tr4 and the transistor Tr5, as shown in FIG. 4 or FIG. 5, respectively.

In step S3, raising of the main mirror is started. The main mirror driving mechanism can be a spring or a motor or the like. In the first preferred embodiment, the mirror actuator is driven corresponding to a magnet mechanism.

In step S4, the stop down diaphragm control operation is performed during the mirror raising. A more detailed description of the stop down operation is given above with reference to FIG. 4.

Upon completion of diaphragm control in step S4, the CPU 1 waits for completion of raising the mirror in step S5. A method for step S5 is using a predicted time to raise the mirror, which is measured from a start time determined in step S2. Another method for step S5 is monitoring a switch that changes state when the mirror is completely raised. No preference is made between these two methods.

Film exposure begins in step S6. In step S6, the transistor Tr4 for front curtain engagement is turned off to demagnetize the coil MG1 (off), which starts the front curtain. The transistor Tr4 is used in front curtain engagement.

In step S7, the detection device receives signals from the sensor 3 installed inside the CPU 1 and detects a long exposure time. A long exposure time includes a long shutter time, bulb shooting, or time shooting.

In a long shutter time case, in step S8 the DC/DC converter 8 is turned off. Such control can be performed by controlling a control terminal in the CPU 1. For example, the connection between the CPU 1 and the DC/DC converter 8 shown in FIG. 1 can be used.

In step S9, the CPU 1 waits until completion of the shutter time or until the exposure completion indication is detected. The exposure indication can be the photographer exposure completion action.

If the exposure completion is detected in step S9, the DC/DC converter 8 is turned on to supply power for subsequent camera control in step S10.

In step S11, the transistor Tr5 for rear curtain engagement is turned off to demagnetize the coil MG2 (off), which starts the rear curtain.

In step S12, completion of rear curtain running is monitored. Alternatively, a 10 mS–20 mS delay time insertion works equally well.

In step S13, film winding (film winding motor) starts (on). Concurrently, each mechanism is charged in preparation for the next film shooting. In step S14, the determination is made whether winding is completed.

Upon winding completion and after the film winding motor is stopped (off), in step S15, the CPU 1 returns to step S1 to enable reception of the next release operation.

Thus, with the first preferred embodiment, during an exposure time such as time shooting, bulb shooting, or a shutter time set longer than the predetermined time, the DC/DC converter 8 that performs electric current control is turned off, which reduces the power consumption of the DC/DC converter 8 itself. Further, with the DC/DC converter 8 off, electric parts such as ICs and devices such as the interface 2, the sensor 3, the display device 4, that do not need electricity supplied during film exposure can also be turned off. The result is a lower current consumption than before on the power source line 7 from the battery power source 6. The lower current consumption causes increased camera battery power source 6 longevity.

In a conventional camera, film exposure time is limited because of power consumption. With the present invention, long film exposure time photography can be performed. Therefore, diversified photography is enabled.

A camera according to the present invention improves at least bulb shooting and time shooting. The reduced camera power consumption can result in more effective use of displays.

To summarize, the CPU 1 can be a control device to control the shooting sequence and includes a clock oscillation circuit (not shown). A processing device included in the CPU 1 stops the clock oscillation circuit during the off-control time of the DC/DC converter 8 corresponding to the film exposure time. The clock oscillation circuit operation is restarted when the process device receives signals from a selected sensor or control mechanism indicating film exposure completion. The processing device further performs subsequent sequence control program operations by the control device.

For example, when performing bulb shooting or time shooting, a specific shutter time is not determined beforehand. Thus, monitoring the time after release of the front curtain during film exposure is unnecessary because exposure completes through a release button or input of a power source switch. In these cases, the DC/DC converter 8 is turned off, and concurrently, the clock oscillation circuit (not shown) is stopped by placing the CPU 1 controlling the shooting sequence in a stand-by mode. Therefore, the power consumption of the CPU 1 itself is very low.

Preferably, in this case, the transistor Tr5 in FIG. 1 is kept on to maintain the shutter rear curtain, because the lowest possible amount of power is consumed in using this type of shutter mechanism.

A change in the release button or the power source switch interrupts the CPU 1 before placing the CPU 1 in the stand-by mode. Then, the clock oscillation circuit resumes oscillation, and the control device resumes processing based on the rear curtain release operation.

The camera exposure control device according to the present invention has a DC/DC converter on the power source line from the battery power source. An exposure control device selects and controls the bulb shooting mode or the time shooting mode. A control device controls the DC/DC converter to not operate, which reduces power consumption during photography when the film exposure time of the exposure control device is longer than the predetermined time.

The present invention accomplishes these superior efficiencies and effects using a simple structure.

When shooting a long exposure time photograph using more than several seconds of exposure time, the DC/DC converter conducting electric current voltage control on the power source line from the battery power source is stopped. Power consumption of the DC/DC converter itself is eliminated. Moreover, by stopping the DC/DC converter, electric parts such as ICs, devices, and the like are also turned off. Therefore, consumption on the power source line from the battery power source is reduced to as little as possible.

Reduced current consumption during long exposure time increases the camera battery power source longevity.

Thus, diversified camera photography including long film exposure time, which were previously limited by power consumption, can be performed.

The camera exposure control device may further include a clock oscillation circuit, a sequence control device controlling based on the shooting sequence control, and a processing device operating the clock oscillation circuit and the control device in conjunction with the film exposure operations. The process device stops the clock oscillation circuit when the control device stops the DC/DC converter during film exposure and restarts the clock oscillation circuit based on film exposure completion signals. The film exposure signals also restart the control device processing after the shooting sequence. The camera exposure control device is especially effective for bulb shooting and time shooting by effecting reduced power consumption.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A camera exposure control device including a DC/DC converter on a power source line from a battery power source and exposure control means for controlling long exposure times, the camera exposure control device comprising control means for controlling the DC/DC converter to cease operation during film exposure by the exposure control means when the control means detects that the film exposure time of the exposure control means is set longer than a predetermined time.

2. A camera exposure control device including a DC/DC converter on a power source line from a battery power source and exposure control means for selecting and controlling one of a bulb shooting mode and a time shooting mode, the camera exposure control device comprising:

detection means for detecting the selection of the bulb shooting mode and the time shooting mode, and control means for controlling the DC/DC converter to cease operation during film exposure when the detection means detects selection of the bulb shooting mode and the time shooting mode.

3. The camera exposure control device according to claim 2, further comprising:

sequence control means including a clock oscillation circuit for controlling a shooting sequence based on a shooting sequence control device; and process means for processing a clock operation process of the clock oscillation circuit and an execution process of the shooting sequence control device during the film exposure.

4. The camera exposure control device according to claim 3, wherein the process means stops the clock oscillation circuit when the control means controls the DC/DC converter to cease operation during the film exposure, restarts the clock oscillation circuit based on film exposure completion signals, and restarts the shooting sequence control device after the shooting sequence by the sequence control means.

5. The camera exposure control device according to claim 2, wherein the control means controls a shooting sequence and includes a clock oscillation circuit, the camera exposure control device further comprising process means for processing an execution process of the control means during the film exposure operation, wherein the process means changes the control means to a standby mode to interrupt operation of the clock oscillation circuit and the DC/DC converter during the film exposure, restarts the clock oscillation circuit based on film exposure completion signals, and restarts the control means after the shooting sequence.

6. A camera exposure control device, comprising:

a DC/DC converter operating on a power source line from a battery power source;

a control device that performs at least film shooting sequence operations including control of the DC/DC converter, the control device stops the DC/DC converter operations during film exposure when the control device detects that a film exposure time exceeds a predetermined time.

7. The camera exposure control device according to claim 6, further comprising a detection device that detects film exposure modes including at least one of a bulb shooting mode and a time shooting mode and outputs a mode signal to the control device, wherein the control device stops the DC/DC converter operations during film exposure when the mode signal indicates one of the bulb shooting mode and the time shooting mode and outputs an execution signal.

8. The camera exposure control device according to claim 7, further comprising:

a power supply line;

a sensor device;

an interface device; and at least one display device, the DC/DC converter supplying a power source to at least the sensor device, the interface device and the at least one display device via the power supply line.

9. The camera exposure control device according to claim 6, further comprising:

a clock oscillation circuit; and a process device that processes the execution signal of the control device, the process device stopping the clock oscillation circuit when the execution signal is received.

10. The camera exposure control device according to claim 9, further comprising a film exposure device that outputs a film exposure complete signal when the film exposure time is complete, the control device starting DC/DC converter operations based on the film exposure complete signal.

11. The camera exposure control device according to claim 6, further comprising:

a film exposure device that outputs a film exposure complete signal to the control device when the film exposure time is complete; and a process device receiving the execution signal of the control device, wherein upon receipt of the execution signal, the process device stops the control device, the control device restarting on receipt of the film exposure complete signal.

12. The camera exposure control device according to claim 11, wherein the film exposure complete signal is a rear curtain release signal.

13. A method for performing exposure control on a camera comprising the steps of:

operating a DC/DC converter on a power source line from a battery power source;

performing film shooting sequence operation;

detecting a film exposure time; and interrupting the DC/DC converter operations during the film exposure time when the detected film exposure time exceeds a predetermined time.

14. The method of claim 13, wherein the detecting step comprises detecting at least a bulb shooting film exposure mode and a time shooting film exposure mode, the interrupting step further comprising interrupting the DC/DC converter operations when the mode signal is one of the bulb shooting mode and the time shooting mode.

15. The method of claim 13, wherein the interrupting step further comprises interrupting at least a sensor device operation, an interface device operation, and at least one display device operation.

16. The method of claim 13, wherein the interrupting step further comprises:

oscillating a clock oscillation circuit to start and maintain the DC/DC converter operation; and stopping the DC/DC converter operation during the film exposure time by stopping the clock oscillating circuit.

17. The method of claim 13, further comprising the steps of:

detecting completion of the film exposure; and starting the DC/DC converter operation after the film exposure is complete.

18. The method of claim 13, further comprising the steps of:

outputting a film exposure complete signal;

detecting completion of the film exposure; and starting the DC/DC converter operation after the film exposure is complete.

19. The method of claim 13, further comprising the steps of:

interrupting the control device during the film exposure when the film exposure time exceeds the predetermined time; and restarting the control device operation after the film exposure is complete.

* * * * *